(12) United States Patent
Schultes et al.

(10) Patent No.: US 8,985,452 B2
(45) Date of Patent: Mar. 24, 2015

(54) SAFETY DEVICE AND METHOD FOR USING A SAFETY DEVICE

(75) Inventors: Gerhard Schultes, Unterpremstatten (AT); Christoph Tomschitz, Hartberg (AT)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/003,779

(22) PCT Filed: Mar. 8, 2012

(86) PCT No.: PCT/EP2012/053951
§ 371 (c)(1),
(2), (4) Date: Sep. 6, 2013

(87) PCT Pub. No.: WO2012/120062
PCT Pub. Date: Sep. 13, 2012

(65) Prior Publication Data
US 2013/0341393 A1 Dec. 26, 2013

(30) Foreign Application Priority Data

Mar. 9, 2011 (DE) .......................... 10 2011 001 169

(51) Int. Cl.
*G06K 7/08* (2006.01)
*G06K 7/00* (2006.01)
(Continued)

(52) U.S. Cl.
CPC ............ *G06K 19/00* (2013.01); *G06K 19/0716* (2013.01); *G06K 19/0717* (2013.01)
USPC ........... 235/451; 235/383; 235/385; 235/439; 235/492

(58) Field of Classification Search
CPC .......... G06K 19/0723; G06K 7/10128; G06K 2017/0045; G06K 2017/0074; G06K 19/0701; G06K 19/07372; H01Q 1/2225; G07G 1/009; G07G 3/003; G08B 13/2448; G08B 13/2482
USPC ........................... 235/375, 383, 451, 492, 385
See application file for complete search history.

(56) References Cited

U.S. PATENT DOCUMENTS 6,025,780 A * 2/2000 Bowers et al. ............. 340/572.3
6,712,276 B1 * 3/2004 Abali et al. .................... 235/492
(Continued)

FOREIGN PATENT DOCUMENTS

| EP | 0511807 A1 | 11/1992 |
|----|------------|---------|
| EP | 2221750 A1 | 8/2010 |
| JP | 2009301482 A | 12/2009 |

OTHER PUBLICATIONS

International Search Report issued Jun. 1, 2012, in parent International Patent Application No. PCT/EP2012/053951.
(Continued)

*Primary Examiner* — Tuyen K Vo
(74) *Attorney, Agent, or Firm* — North Weber & Baugh LLP

(57) ABSTRACT

The invention relates to a security device with sensors for checking whether the security device (1) is in an undamaged state and checking for the presence of a specified support (9) of the security device (1), said support (9) being an object, in particular a mechanical or electronic component, characterized in that the sensors detect movements and/or accelerations of the security device (1) relative to the support (9) and/or material properties of the support (9) and/or of the security device (1) and are connected to an electronic system (3) for signal evaluation. In a method for using such a security device (1) the state of the security device (1) and the presence of a specified support (9) are ascertained multiple times and in different ways, wherein signals are used which are obtained as actual values and which are compared with specified target values in an electronic system (3). An action is triggered upon a deviation of at least one of the actual values from the target values.

17 Claims, 3 Drawing Sheets

(51) Int. Cl.
*G06K 19/06* (2006.01)
*G06K 19/00* (2006.01)
*G06K 19/07* (2006.01)

(56) References Cited

U.S. PATENT DOCUMENTS

| | | |
|---|---|---|
| 7,106,199 B2 | 9/2006 | Lee et al. |
| 2007/0194933 A1* | 8/2007 | Shanks et al. .............. 340/572.7 |
| 2007/0285229 A1 | 12/2007 | Batra |
| 2008/0143519 A1* | 6/2008 | Piotrowski ................... 340/540 |
| 2009/0317002 A1* | 12/2009 | Dein ............................ 382/224 |
| 2013/0264786 A1* | 10/2013 | Hannah et al. ........... 280/33.994 |
| 2014/0025313 A1* | 1/2014 | Potyrailo et al. ................ 702/23 |
| 2014/0041084 A1* | 2/2014 | Proksch et al. ................. 850/33 |

OTHER PUBLICATIONS

Written Opinion issued Jun. 1, 2012, in parent International Patent Application No. PCT/EP2012/053951.

International Preliminary Report on Patentability issued Sep. 10, 2013, in parent International Patent Application No. PCT/EP2012/053951.

* cited by examiner

SAFETY DEVICE AND METHOD FOR USING A SAFETY DEVICE

CROSS REFERENCE TO RELATED PATENT APPLICATIONS

This application is the National Phase Application under 35 USC §371 of International Application No. PCT/EP2012/053951, filed Mar. 8, 2012, which claims priority to German Patent Application 10 2011 001 169.2, filed Mar. 9, 2011, both of which are incorporated by reference in its entirety.

BACKGROUND

A. Technical Field

The present invention relates to a security device with sensors for checking whether the security device is in an undamaged state and to check for the presence of a specified support of the security device, said support being in particular a mechanical or electronic component, and also to the use of a security device.

B. Background of the Invention

An RFID system with a sensor is known from U.S. Pat. No. 7,106,199 B2. The RFID system is disposed in a tag and contains an IC component as well as a coil. Furthermore a sensor is associated with the RFID system. The sensor is provided in order to measure specific information, which may for example ascertain the temperature, humidity, pressure, illumination or other features. The product characteristics of the object to which the RFID system is adhered can be ascertained and monitored with such an RFID system with a sensor. Thus such RFID systems can for example be used in the storage of sensitive foodstuffs, for which it is necessary to keep the foodstuffs under specific conditions, for example within a specific temperature range.

It is a disadvantage in such RFID systems that it is not possible to check whether the RFID system has been manipulated. Thus for example the RFID system could be removed from the products to be monitored and re-attached at a later time. As a result the sensor would not be able to ascertain any inadmissible irregularities in the storage of the products.

SUMMARY OF THE INVENTION

Thus the object of the present invention is to provide a security device having sensors which in particular can monitor whether the security device has been removed from a specified support, for example a foodstuff.

The object is achieved by a security device and a method for using such a security device with the features of the independent claims.

The security device according to the invention has sensors for checking the undamaged state of the security device. Furthermore it checks for the presence of a specified support of the security device. The specified support of the security device may be any object, for example a mechanical or electronic component, a vehicle or also a foodstuff or other goods, for which it is important that the security device remains connected to the product or the component and no manipulation by removal of the security device from the object can occur. In particular the aim is to prevent the security device from being removed from the specified carrier or attached to another support in order to prevent monitoring or identification of the original support. According to the invention the security device is equipped with sensors which detect movements and/or accelerations of the security device with respect to the support and/or material properties of the support and/or of the security device. The sensors are connected to an electronic system for evaluation of the signals from these sensors. In the electronic system the signals from the sensors are evaluated and an action is triggered if it is ascertained that the signals do not correspond to a specific target signal. Such an action may for example be the generation of an acoustic or optical signal, sending of a wirelessly transmitted message (radio message) or the suspension of a wirelessly (radio) transmitted item of status information or also only the storage of this signal deviation, in order to be able to demonstrate this signal deviation at a later time. From the signal deviation conclusions are then drawn as to a manipulation of the security device.

In a preferred embodiment of the invention the sensor is of the capacitive and/or inductive type for detection of the material properties of the support and/or of the security device. Alterations in voltage which are produced by or during the removal of the security device from the support or by the replacement of the support are detected by the sensor and relayed to the electronic system for signal evaluation.

If in an advantageous embodiment of the invention the sensor for detection of the movements and/or accelerations of the security device relative to the support is an acceleration, magnetic field and/or rotational rate sensor, then signals can be generated which indicate a movement of the security device relative to the support. In particular, if the support is for example a large and inert object, such as for instance a vehicle, specific acelerations or movements of the object are expected in normal operating mode. However, when the security device is detached from the support, because of the substantially lower mass of the security device relative to the support object, significantly different accelerations and movements are achieved. These differences in the actual values and the target values are used for evaluation of the manipulation of the security device.

The security device is preferably provided with means for the firm attachment of the security device to the support. This means may for example be a bonding device, but may likewise be a weld or solder point or also a screw or rivet connection. The security device may also be welded or cast into the support. Since the support can be produced from a conductive or non-conductive metal or plastic or also another material, the choice of attachment means is also dependent upon this material and can be selected in a suitable manner.

It is particularly advantageous if the security device is attached to a metal support. In this case it may be sufficient that the object to be monitored is formed of metal at least at the attachment site of the security device. In this way the security device can ascertain a manipulation particularly simply and reliably, since the metal support generates very clear signals of the capacitive and inductive sensors and also of the magnetic field sensors. However, the security device according to the invention can of course also be used with non-metallic supports, and although the measurement results of the individual sensors are different from those of metals, they are just as capable of evaluation.

It is particularly advantageous if the capacitive sensor has a capacitor electrode which is integrated in the security device and interacts with the support as second electrode or with a further electrode integrated in the security device. In this case it is particularly advantageous if the electrodes are situated opposite one another, i.e. if the first electrode is disposed in the security device and the second electrode is disposed in the support. The capacitance produced in this way can be very simply detected. If the capacitive sensor is supplied for example with a constant alternating current supplies, then the change in the distance of the support from the security device, such as would occur for example in an attempt to detach the security device from the support, produces a change in the capacitance or a change in the amplitude of the alternating current voltage. Likewise the capacitance or the amplitude of the alternating current voltage changes if an attempts is made to replace the support by another support, in particular a support made from another material. If for example the electrodes of the capacitor are located inside the security device, then in the case of a security device fastened on the support the measured capacitance will be very small. If the security device is located on a plastic object, then the capacitance is average, whereas in the case of a metal object the capacitance will be high. The different dielectric constants in this case lead to different capacitance signals and thus allow a conclusion to be drawn as to the material to which the security device was attached or from which it was detached.

The electrode integrated in the security device is in particular a metal foil. This can be particularly easily affixed in the security device and used as electrode of the capacitive sensor.

In a particularly advantageous embodiment of the security device the inductive sensor of the security device is an eddy current sensor. In this case a ferrite core is surrounded by a winding. If this winding, which constitutes a coil through which an alternating current flows, then the support induces eddy currents. The alternating current resistance of the coil changes hereby and causes an electrical signal. The distance of the eddy current sensor from the support can be ascertained by means of this electrical signal. The eddy current sensor requires a conductive object, for example a metal object, as support. The eddy current effect measures the energy losses (absorption) in a conductive medium independently of the magnetic behaviour. The inductance changes due to the magnetic properties of the support independently of the conductivity thereof. In practice, for example, iron is conductive and magnetic. Thus a mixing effect occurs here. If the support is made from iron a high inductance is produced, whereas in the case of a support made for example from aluminium or copper a low inductance is produced. Thus the distance of the sensor and thus of the security device from the support is determined by this inductive sensor. If in the event of an attempt to detach the security device the distance from the support changes, a signal is generated which just like the capacitive signal can be recorded or can lead to an action effected by the security device, such as for example the generation of an optical or acoustic signal, the sending of a wirelessly transmitted message (radio message) or the suspension of a wirelessly transmitted (radio) item of status information.

If the security device is at least partially integrated in a tag, this results in a particularly simple use of the security device. The tag by which a specific product, component or other object is secured may contain the security device, which may be of very small design, in a suitable manner.

It is particularly advantageous if the electronic system by which the signals from the sensors of the security device are evaluated is likewise connected to the tag. This avoids complex wiring which would produce a further possibility for manipulation of the security device. In this case the electronic system can for example, like the sensors, be integrated in the tag and is not accessible from the exterior without destruction of the tag. This results in a particularly high level of security of the security device against destruction or manipulation.

If the integrated electrode of the capacitive sensor and/or the inductive sensor is disposed in a layer of the tag, then simple production and nevertheless extremely secure design of the security device is possible. In particular, in terms of its inductance the inductive sensor is independent of a non-metallic layer of the tag. Also the capacitive sensor which is disposed in a layer of the tag can constitute a specific capacitance. Since for the determination of the condition of the security tag on the support it is not the magnitude of the capacitance but only the change in the capacitance which is crucial, this is equally harmless. By the arrangement of the sensors in a layer of the tag the sensors can be installed and protected against environmental influences and can also be secured thereby against damage or manipulation.

It is particularly advantageous if the tag additionally has an RFID sensor. Additional functions of the security device can be produced by the RFID sensor. Thus for example the presence of the security device or of the tag can be detected by a reader Likewise the signals from the sensors can be transmitted via the RFID sensors to a reader. With this active status communication an alarm situation occurs for example when the status communication stops for a time or an alarm message is sent.

If the tag is designed to be self-adhesive, then it can be very simply disposed on the support. In the event of detachment of the tag from the support, clear changes in signals from the sensors are generated.

In the method according to the invention for use of the security device the state of the security device and the presence of a specified support is ascertained multiple times in different ways. In this case for example signals are used which are obtained as actual values both by inductive and by capacitive measurement and which are compared with predetermined target values in an electronic system. An action can for example be triggered in the event of a deviation of at least one of the actual values from the target values. Due to the monitoring of the security device multiple times and in different ways with regard to the specified support, a particularly high degree of security against manipulation is obtained. Both the detachment of the security device from the support or even the mere transfer of the security device to another support triggers recognisable changes in the signal from the sensors, which can be stored or used to generate a warning signal. The associated electronic system monitors the deviation of the predetermined target values from the actual values and in this way recognises an attempt at manipulation of the security device. Due to the different sensors which identify the manipulation of the security device it is possible to ascertain both for example the distance and also the material of the support on which the security device is disposed.

If the distance and/or the position of the security device relative to the support and the material of the support is established by the sensors and the signals thereof, then by a comparison of these criteria with a desired value the manipulation of the security device can be identified if these values should change.

If an alternating current is applied to the sensors and the signal amplitude and/or signal frequency is analysed, then in this way a change in the distance, change in position or a change of the support material can be determined.

The signals are advantageously obtained from measurements of the movements and/or accelerations of the security device with respect to the support and/or material properties of the support and/or of the security device. Manipulations of many different types can be revealed in this way.

BRIEF DESCRIPTION OF THE DRAWINGS

Further advantages of the present invention are described in the following embodiments. In the drawings.

DETAILED DESCRIPTION OF THE PREFERRED EMBODIMENTS

The present invention also relates to a procedure for operating a class-appropriate therapy device.

Figure 1:
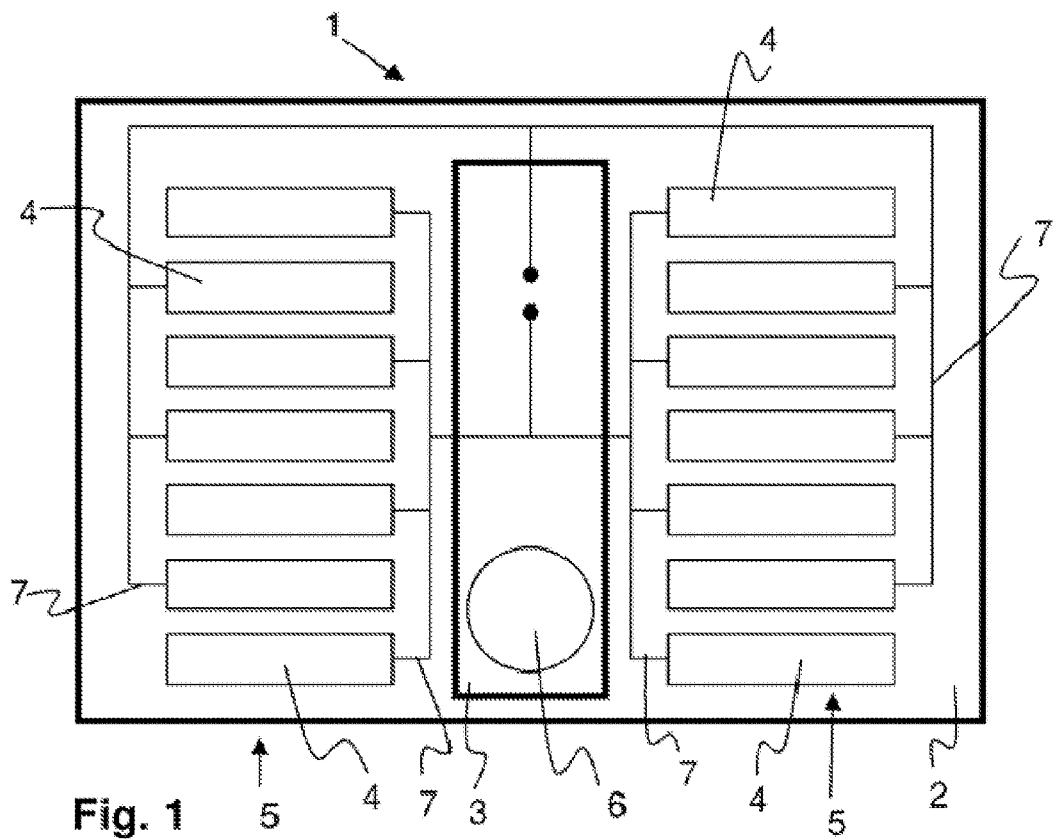
FIG. 1 shows a plan view of a security device according to the invention.

In FIG. 1 a security device 1 according to the invention is illustrated sketchily in plain view. In the illustrated embodiment the security device 1 is a tag 2 on which an electronic system 3 is disposed. The evaluation of the signals which are generated by a capacitively operating sensor 5 with electrode 4 and by an eddy current sensor 6 which operates with inductive signals, takes place in the electronic system 3.

The capacitive sensor 5 has the electrodes 4 which are constructed as plate-shaped metal foils and are integrated in the tag 2. The electrodes 4 are connected to the electronic system 3 by means of conductive tracks 7. At the ends thereof in the electronic system 3 the capacitance of the electrodes 4 or of the capacitive sensor 5 can be detected and evaluated.

The eddy current sensor 6 is disposed in the region of the electronic system 3 and thus is likewise connected to the tag 2. The inductive signals of the eddy current sensor 6 are likewise evaluated in the electronic system 3. The security device 1 is connected to an alternating current source (not shown). Both the eddy current sensor 6 and also the capacitor 5 are operated by means of the alternating current. Changes to the alternating current signal or changes to the capacitance or inductance lead to the recognition that the position of the security device 1 is changed relative to a support on which the security device 1 is disposed. This change in signal and thus the change in the position of the security device 1 in relation to the support can be evaluated by means of the electronic system 3 and stored for later analysis or immediately indicated by means of an acoustic or optical signal.

On the basis of the schematic representation in FIG. 1 the sensor designated as the eddy current sensor 6 may also be an acceleration sensor or rotational rate sensor. Such sensors, which for example are MEMS sensors, can likewise be integrated in the illustrated security device 1. They can be used in place of one or both of the illustrated sensors 5, 6 used be or in addition to one or both of the sensors 5, 6. In any case it is important that a manipulation of the security device 1 with regard to the support 9 (see FIG. 2) is recognised by means of a change of signals relative to the unmanipulated state.

Figure 2:
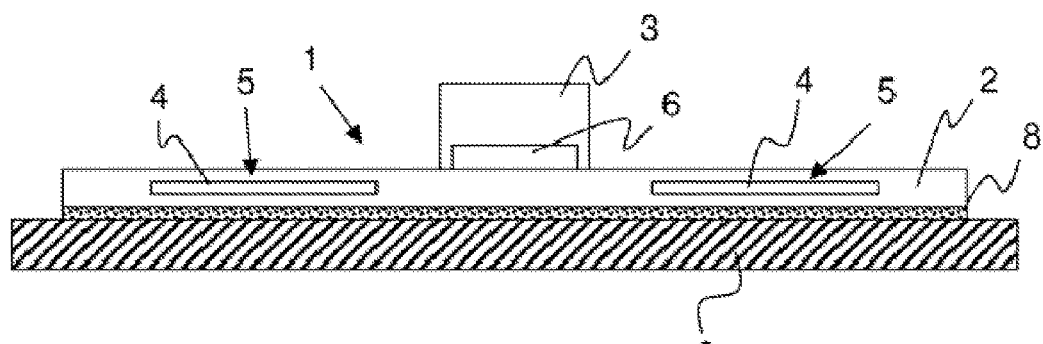
FIG. 2 shows a section through a security device according to FIG. 1 on a support.

FIG. 2 shows a section through a security device according to FIG. 1. The tag 2 contains the electrodes 4, which in this embodiment are integrated, for example cast, in the tag 2. Also connected to the tag 2 is the electronic system 3 and also the eddy current sensor 6.

The tag 2 is fastened by means of an adhesive layer 8 on the support 9. In the attempt to release the adhesive layer 8 either the tag 2 is changed in its position or its distance from the support 9 or an attempt is made to push an element between the adhesive layer 8 and the support 9. Also as a result the distance of the tag 2 from the support changes or at least the material of the support 9 recognised by the sensors of the security device 1 is changed by the interposition of a detaching device. Both types of changes are detected by the sensors and can be correspondingly evaluated.

Figure 3:
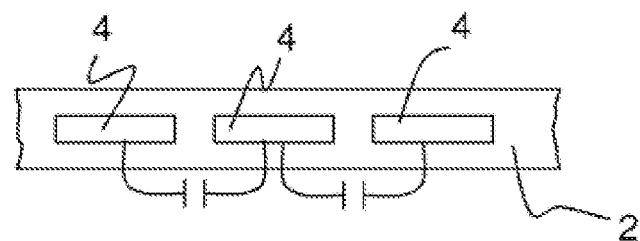
FIG. 3 shows a section through a security device in the region of the capacitive sensor.

FIG. 3 shows a detail of a tag 2 in the region of the electrodes 4. The tag 2 is not fastened to the support 9. The electrodes 4 form a very small capacitance by means of the dielectricity of the air. This very low capacitance can be detected by the electronic system 3 and during the evaluation it can be concluded that the tag 2 is not fastened on any carrier 9.

Figure 4:
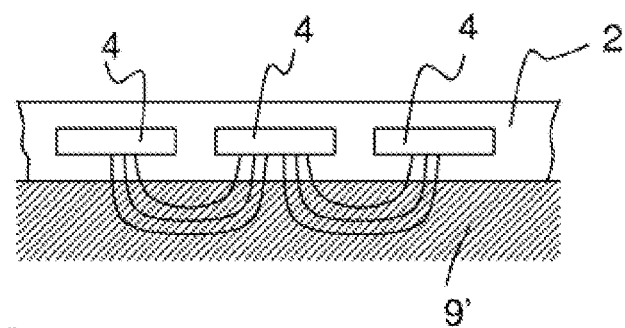
FIG. 4 shows a section through a security device on a plastic support in the region of the capacitive sensor.

In FIG. 4 is the tag 2 of FIG. 3 is fastened on a plastic support 9'. Because of the higher dielectric constant of the plastic material the electrodes 4 have a medium capacitance. Thus by means of the electronic system 3 it is thus ascertained that the material of the support 9' of the tag 2 is neither air nor metal.

Figure 5:
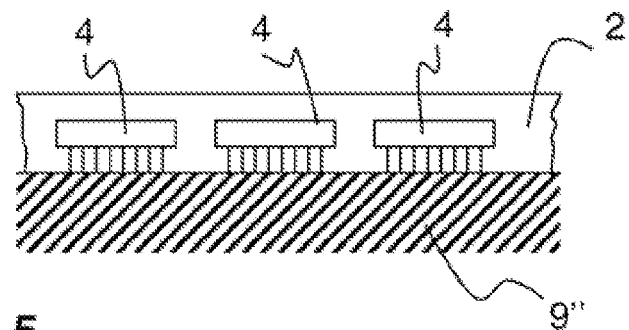
FIG. 5 shows a section through a security device on a metal support in the region of the capacitive sensor.

In FIG. 5 the tag 2 is disposed on a metal support 9". The metal of the support 9" short-circuits the field between the electrodes 4, so that the gap between the capacitor plates or electrodes 4 is small. The capacitance achieved thereby is great. Thus the electronic system ascertains that the tag 2 is disposed on a metal beam 9".

In addition to the characteristic of the support material 9' or 9" from the above-mentioned Figures, of course even the material of the tag 2 also plays a part. If the tag 2 is to be manipulated in any way, then here too the capacitance would change, since the dielectric constant would be changed by the introduction of another material and thus would lead to a change in the target capacitance.

Figure 6:
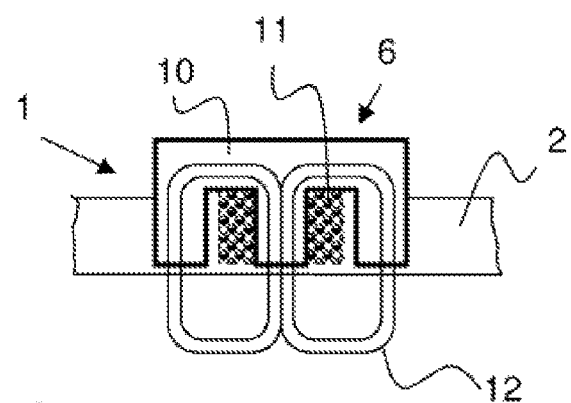
FIG. 6 shows an inductive sensor of a security device and FIG. 7 shows an inductive sensor of a security device on a metal support.

Thus with the capacitor 5 which measures capacitively it is possible to measure the material properties both of the substrate, i.e. generally the support 9, and also the material properties of the security device 1 or of the tag 2 and to ascertain changes. FIG. 6 shows the schematical representation of an eddy current sensor 6. The eddy current sensor 6 consists of a ferrite core 10 as well as a winding 11. The eddy current sensor 6 is connected to the tag 2, for example cast therein. If the eddy current sensor 6 is supplied with an alternating current then a magnetic field 12 is generated. In this case the inductance is just as great as the electrical charge, since in the present embodiment according to FIG. 6 the tag 2 is not fastened to any support 9.

Figure 7:
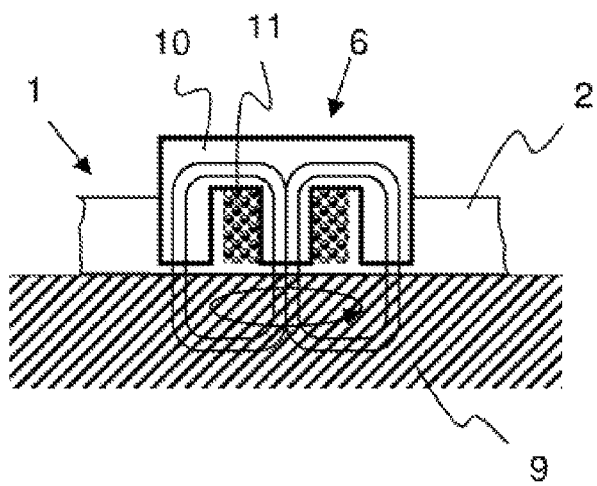

If the eddy current sensor 6 according to FIG. 7 with the tag 2 is located on a support 9, then an eddy current is induced by the field of the coil of ferrite core 10 and winding 11. If the support 9 is made from iron material, then the inductance is high. If the support 9 is made from aluminium, copper or similar material, then the inductance is low. If the support 9 is made from a conductive material, then the absorption is high, but on the other hand with a non-conductive material it is low. If the carrier 9 is made from a ferromagnetic material, then the inductance rises, in the case of a paramagnetic material the inductance drops.

The eddy current sensor 6 can ascertain material properties, such as for example the conductivity or the magnetic characteristics, of the substrate and of the support film of the tag 2. If the tag 2 is manipulated so that metal is introduced between the eddy current sensor 6 and the support 9, then the inductance changes. The same applies to the case where the support 9 is changed. Also the distance of the eddy current sensor 6 from the carrier 9 can be established by a change in the inductance. Thus manipulations of the security device 1, in which the security device 1 or the label 2 is lifted off from the support 9, are also recognised by the eddy current sensor 6, such as the change in the support material or the change in the material of the tag 2.

The security device 1 according to the invention has a very high level of security against attempts at manipulation. Both the exchange of individual materials and also the change in the distance of the security device 1 from a support 9 can be detected and evaluated by the electronic system. When corresponding sensors are used, the relative movement with regard to the support can also be recognised.

Naturally the security device can also be integrated on other elements as a tag 2 or a film. Thus all components which are particularly critical with regard to detachment from their support, can be equipped therewith. Moreover the tag 2 or the security device 1 may be combined with a RFID sensor (not shown). In this way the signals of the electronic system can be transmitted to a reader or also further information can be communicated to the tag 2 or to the support 9. Thus the identification of the support 9 is also possible, such as the evaluation of the history of the support 9. In particular for evaluation of this history of the support 9 or of the corresponding object, additional sensors, such as are known from the prior art, can be combined with the security device 1. Thus it can be ensured that the support 9 or the object undergo a prescribed history, for example with regard to temperature, humidity or pressure, for example during a transport or storage operation. A manipulation by for example a replacement of these sensors is secured by the associated security device 1 against manipulation.

The present invention is not limited to the illustrated embodiments. The individual sensors can also be combined with other one another in ways not described in the embodiments. Likewise all further disclosed individual features of the invention can be combined with one another, even if they have not been described in that way. Accordingly modifications in the context of the claims are possible at any time.

It is particularly advantageous that the invention can be carried out in such a way that the security device is constructed such that the destruction of the security device upon detachment is also accompanied by an irreversible change in the measured values. In particular the contact resistance of a loop or the capacitance is changed upon detachment so that the original state can no longer be achieved. It may also be provided that the tag has predetermined breaking (tearing) points, so that it can be destroyed in a defined manner upon detachment.

LIST OF REFERENCE SIGNS 1 security device
2 tag
3 electronic system
4 electrodes
5 capacitive sensor
6 eddy current sensor
7 conductive tracks
8 adhesive layer
9 support
9' plastic support
9" metal support
10 ferrite core
11 winding

The invention claimed is:

1. A security device comprising:
 sensors for checking whether the security device is in an undamaged state and checking for a presence of a specified support of the security device;
 the sensors configured to detect at least one of material properties of the support and the security device and generate a signal for the at least one of the material properties; and
 wherein the security device is coupled to an electronic system that is configured to compare an actual value of the signal with a predetermined target value and trigger an action upon a deviation of the actual value from the predetermined target value.

2. The security device according to claim 1 wherein the sensor is of the capacitive and/or inductive type for detection of the material properties of the support and/or of the security device.

3. The security device of claim 1 wherein the sensor for detection of the movements and/or accelerations of the security device with respect to the support is an acceleration sensor, a magnetic field sensor and/or a rotational rate sensor.

4. The security device of claim 1 further comprising means for firm attachment to the support.

5. The security device of claim 4 wherein the means for firm attachment to a support comprises metal at least at one attachment site.

6. The security device of claim 1 wherein the sensor has a capacitor electrode which is integrated in the security device and interacts with the support as a second electrode or with a further electrode integrated in the security device.

7. The security device of claim 6 wherein the capacitor electrode is a metal foil.

8. The security device of claim 2 wherein the inductive type sensor is an eddy current sensor.

9. The security device of claim 1 wherein the security device is integrated at least partially in a tag.

10. The security device of claim 1 wherein the electronic system is connected to the tag.

11. The security device of claim 1 wherein an electrode of the sensors is disposed in a layer of the tag.

12. The security device of claim 1 wherein the sensors include an RFID sensor.

13. The security device of claim 1 wherein the security device is self-adhesive.

14. A method for determining whether a security device is in an undamaged state, the method comprising:
 sensing for a first time whether the security device has been removed from a support associated with the security device;
 sensing for a second time whether the security device has been removed from the support associated with the security device, the sensing for a second time step comprising at least a different sensed measurement than the first sense;
 wherein at least one of the steps of sensing for the first and second times includes detecting at least one of material properties of the support and the security device; and
 wherein signals are used which are obtained as actual values and which are compared in an electronic system with predetermined target values, and an action is triggered upon a deviation of at least one of the actual values from the target values.

15. The method of claim 14 wherein a distance and/or a position of the security device relative to the support and the material of the support is ascertained by the first and second sensing steps and the signals therefrom.

16. The method of claim 14 wherein an alternating current is applied during the first and second sensing steps and a signal amplitude and/or signal frequency is analyzed.

17. The method of claim 14 wherein the signals are obtained from measurements of the movements and/or accelerations of the security device relative to the support and/or the material properties of the support and/or the security device.

<p style="text-align:center">* * * * *</p>